United States Patent Office 2,913,484
Patented Nov. 17, 1959

2,913,484

DIPHENYLMETHYL 3,4-DICHLOROBENZOATE

David A. Gordon, Midland, Mich., assignor to The Dow Chemical Company, Midland, Mich., a corporation of Delaware No Drawing. Application May 19, 1958
Serial No. 735,934

2 Claims. (Cl. 260—476)

The present invention is directed to the novel compound diphenylmethyl 3,4-dichlorobenzoate. The compound corresponds to the formula:

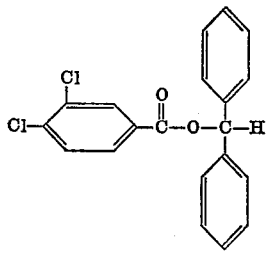

This novel compound is a crystalline solid, soluble in many common organic solvents such as benzene and petroleum ether, and of very low solubility in water. It is useful as a fungicide for the protection of terrestrial plants, as an insecticide, and as a herbicide in the control of submerged aquatic vegetation.

The compound of the present invention may be produced by reacting benzhydrol with a 3,4-dichlorobenzoyl halide whose acid halogen has an atomic weight of from 30 to 85. In such reaction, in addition to the present compound, hydrogen halide of reaction is formed. The reaction is carried out in the presence of a hydrogen halide acceptor which reacts with the hydrogen halide to form, for example, a salt. It is convenient to carry out the reaction in a substantially inert reaction solvent such as benzene. Good results are obtained when 3,4-dichlorobenzoyl chloride or 3,4-dichlorobenzoyl bromide, or a mixture thereof and benzhydrol are employed in equimolecular proportions and when the hydrogen halide acceptor, which may be a tertiary amine, is employed in an amount at least as great as that stoichiometric with acid halogen of the dichlorobenzoyl halide reactant. The reaction is exothermic and takes place smoothly at temperatures of from 0° to 100° C. The temperature of the reaction mixture may be controlled in usual ways such as by regulating the rate of contacting of the reactants, or by external cooling.

In carrying out the reaction, the 3,4-dichlorobenzoyl chloride or bromide is added slowly, portionwise, and with stirring, to a dispersion of benzhydrol and a hydrogen halide acceptor such as pyridine, in liquid reaction medium. After the 3,4-dichlorobenzoyl halide has been added, the reaction mixture is maintained at temperatures preferably in the stated range, and with stirring, until the reaction is substantially complete. During the course of the reaction, a hydrogen halide salt of hydrogen halide acceptor usually precipitates in the reaction mixture and may thereafter be separated by filtration. The desired dichlorobenzoate product is separated and purified in known ways. In one such procedure, the filtrate may be gently warmed to vaporize and remove liquid reaction medium leaving a crude product residue. This residue may be further purified if desired, by recrystallization from a solvent, or like methods.

The following example illustrates the invention but is not to be considered as limiting.

*Example 1*

3,4-dichlorobenzoyl chloride (105 grams; 0.5 mole) was added dropwise and with stirring at the temperature range of 10° to 30° C. to a dispersion of 92 grams (0.5 mole) benzhydrol together with 39.5 grams (0.5 mole) pyridine in 250 milliliters of benzene. The mixture was stirred and cooled over an ice bath, and thereby maintained at temperatures in the above range, for an hour after addition of the 3,4-dichlorobenzoyl chloride. Stirring was thereafter continued as the reaction mixture was allowed to stand overnight at temperatures which slowly equilibrated with room temperature. During the course of the reaction, pyridine hydrochloride formed and precipitated in the reaction mixture from which it was thereafter removed by filtration. The filtrate was then warmed to vaporize and remove benzene therefrom. The residual crude product was recrystallized from an 86°–100° C. petroleum ether fraction to obtain a white crystalline solid diphenylmethyl 3,4-dichlorobenzoate product. This product melted at 78° to 80° C.

Illustrative of the utility of the present compound is its employment in the control of submerged aquatic vegetation. In a representative operation, healthy growing plants of *Cabomba caroliniana* growing in a small tank of fresh water were exposed for 24 hours to an environment of similar water in which the present compound was dispersed at a concentration of 100 parts per million. After the exposure period, the aqueous dispersion of the present compound was removed and the tank and vegetation thoroughly rinsed with fresh water. The tank containing the vegetation was then refilled with fresh water. Three weeks after completion of the exposure period, the treated plants were examined and found to be virtually entirely killed. In contrast, a smiliar growth of the same aquatic vegetation treated identically, except that the present compound was not employed, was growing profusely.

I claim:
1. Diphenylmethyl 3,4-dichlorobenzoate.
2. A method of preparing diphenylmethyl 3,4-dichlorobenzoate which comprises reacting 3,4-dichlorobenzoyl chloride and benzhydrol in the presence of a hydrogen chloride acceptor.

References Cited in the file of this patent

Ruggeberg et al.: Chem. Abst., 40, 1154 (1946).
Roberts et al.: Chem. Abst., 46, 476 (1952).